US008274644B2

(12) United States Patent
Nisper et al.

(10) Patent No.: US 8,274,644 B2
(45) Date of Patent: Sep. 25, 2012

(54) SENSING TEMPERATURE OF A LIGHT EMITTING DIODE

(75) Inventors: Jon K. Nisper, Grand Rapids, MI (US); Michael J. Mater, Chelsea, MI (US)

(73) Assignee: X-Rite, Inc., Grand Rapids, MI (US)

( * ) Notice: Subject to any disclaimer, the term of this patent is extended or adjusted under 35 U.S.C. 154(b) by 549 days.

(21) Appl. No.: 12/443,150

(22) PCT Filed: Aug. 15, 2006

(86) PCT No.: PCT/US2006/031890
§ 371 (c)(1),
(2), (4) Date: Dec. 31, 2009

(87) PCT Pub. No.: WO2008/020841
PCT Pub. Date: Feb. 21, 2008

(65) Prior Publication Data
US 2010/0128254 A1 May 27, 2010

(51) Int. Cl.
*G01J 5/60* (2006.01)
(52) U.S. Cl. .......................................................... 356/45
(58) Field of Classification Search ...................... 356/45
See application file for complete search history.

(56) References Cited

U.S. PATENT DOCUMENTS

| 4,980,847 | A | * | 12/1990 | Hirano ........................... 702/102 |
| 6,088,142 | A | * | 7/2000 | Cao et al. ......................... 398/95 |
| 7,391,518 | B1 | * | 6/2008 | Schwarz et al. ............... 356/446 |
| 2005/0275809 | A1 | | 12/2005 | Ikebe et al. |
| 2006/0145584 | A1 | | 7/2006 | Rehn |

OTHER PUBLICATIONS

PCT International Search Report for WO 2008/020841 dated Mar. 30, 2007.
PCT/US2006/031890, Aug. 2006, WO 2008/020841.

* cited by examiner

*Primary Examiner* — Roy M Punnoose
(74) *Attorney, Agent, or Firm* — McCarter & English, LLP

(57) ABSTRACT

A system (100) for sensing a temperature of a light emitting diode (LED). The system may comprise an LED having a spectral output centered at a first wavelength, a first filter (104) that transitions from attenuation to transmission at about the first wavelength, and a second filter (106) that transitions from transmission to attenuation at about the first wavelength. The system may also comprise a first sensor (108) positioned to sense a first intensity of the LED through the first filter and a second sensor (110) positioned to sense a second intensity of the LED through the second filter. It will be appreciated that a single sensor may be substituted instead of the first and second sensors, provided that the single sensor is capable of selectively viewing the LED through the first and the second filters. The system may also comprise a computer (112) configured to derive a temperature of the LED considering the first intensity and the second intensity.

13 Claims, 5 Drawing Sheets

SENSING TEMPERATURE OF A LIGHT EMITTING DIODE

CROSS-REFERENCE TO RELATED APPLICATION

The present application claims priority to and is a U.S. national phase application corresponding to International Application No. PCT/US2006/031890 entitled "Sensing Temperature of a Light Emitting Diode", which designated the United States and was filed on Aug. 15, 2006, published in English. The entire content of the foregoing patent application is incorporated herein by reference.

BACKGROUND

For many years, Light Emitting Diodes (LED's) have provided an attractive alternative to traditional incandescent and fluorescent sources because of their small size and energy efficiency. In optical measurement systems, and other applications that benefit from consistent and/or predictable light sources, however, LED's have been slower to catch on. This is because the spectral output of an LED, both in terms of intensity and wavelength, varies greatly with temperature. Attempts have been made to control this variation, for example, by varying the current and/or voltage of LED's or even by heating the LED's prior to use. These methods, however, add additional complexity and expense and, for many applications, still fail to deliver an acceptable level of consistency.

SUMMARY

In one general aspect, the invention is directed to a system for sensing a temperature of a light emitting diode (LED). The system may comprise an LED having a spectral output centered at a first wavelength, a first filter that transitions from attenuation to transmission at about the first wavelength, and a second filter that transitions from transmission to attenuation at about the first wavelength. The system may also comprise a first sensor positioned to sense a first intensity of the LED through the first filter and a second sensor positioned to sense a second intensity of the LED through the second filter. It will be appreciated that a single sensor may be substituted instead of the first and second sensors, provided that the single sensor is capable of selectively viewing the LED through the first and the second filters. The system may also comprise a computer configured to derive a temperature of the LED considering the first intensity and the second intensity.

In another general aspect, the invention is directed to methods of determining a temperature of an LED. The methods may comprise the steps of sensing a first intensity of the LED through a first filter and sensing a second intensity of the LED through a second filter. The first filter may transition from attenuation to transmission at about a peak wavelength of the LED, and the second filter may transition from transmission to attenuation at about the peak wavelength of the LED. The methods may also comprise the step of calculating a temperature of the LED considering the first intensity and the second intensity.

In yet another general aspect, the invention is directed to methods of calibrating a system for determining a temperature of a light emitting diode (LED). The methods may comprise the step of activating the LED at a first known temperature. The methods may also comprise the steps of sensing a first intensity of the LED through a first filter, and sensing a second intensity of the LED through a second filter. The first filter may transition from attenuation to transmission at about a peak wavelength of the LED, and the second filter may transition from transmission to attenuation at about the peak wavelength of the LED. The methods may also comprise the step of relating the first intensity and the second intensity to the first temperature.

BRIEF DESCRIPTION OF THE FIGURES

Embodiments of the present invention are described herein, by way of example, in conjunction with the following figures, wherein.

DETAILED DESCRIPTION OF THE INVENTION

Embodiments of the present invention are directed to systems and methods for measuring the temperature of a light emitting diode (LED). LED temperatures measured according to various embodiments may be used for any suitable purpose. For example, the spectral output of an LED over a range of temperatures may be generalized based on models of the underlying physics and/or experimental characterizations. Accordingly, the measured temperature of an LED may be used to derive an indication of the LED's spectral output. Also, for example, the temperature of an LED taken near the time when the LED is first illuminated may indicate the ambient air temperature surrounding the LED.

Figure 1:
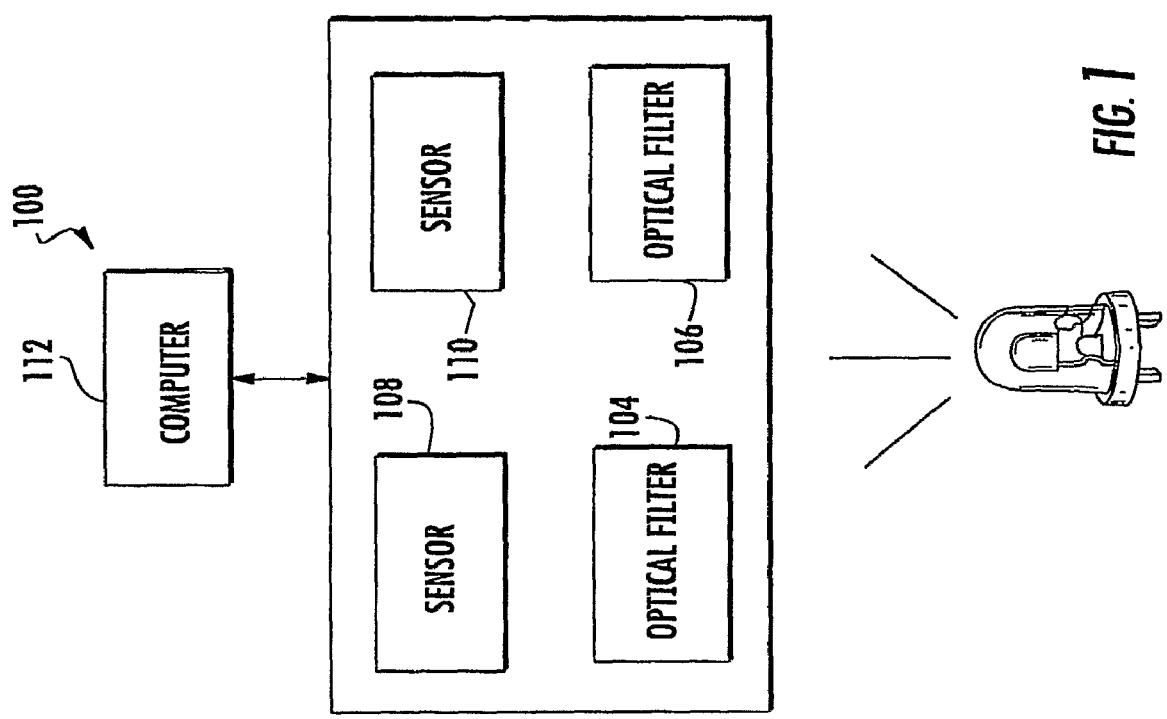
FIG. 1 shows a diagram of a system for measuring the temperature of a light emitting diode (LED) according to various embodiments.

FIG. 1 shows a block diagram of a system 100 for measuring the temperature of a light emitting diode (LED) 102. In addition to the LED 102, the system 100 may include one or more sensors 108, 110, with a pair of optical filters 104, 106 positioned between the LED 102 and the sensors 108, 106. The sensors 108, 110 may sense the output of the LED 102 through the respective filters 104, 106. Two sensors 108, 110 are shown, however, it will be appreciated that one of the sensors 108, 110 may be omitted, for example, if the remaining sensor is able to selectively view the output of the LED 102 through both of the filters 104, 106. The system 100 may also comprise a computer 112 or other suitable processing device to store and analyze signals from the sensors 108, 110.

It will be appreciated that the spectral output of the LED 102 may vary with temperature in a predictable way. For example, the materials used to produce LED 102, such as GaAs, GaN, etc., have inherent dispersive properties (e.g., dielectric constant, complex refractive index, etc.) that vary with both wavelength and temperature (dn/dT and dn/dλ). As a result, the LED 102 may exhibit behaviors that vary proportionately to $\lambda^2/\Delta\lambda$, as the temperature, forward current and/or forward voltage change. Also, as temperature increases, the physical dimensions of LED's 105 dies may change. This, together with the changes in dispersion, may result in a net shift of the peak wavelength, λ, output, a decrease in light output, and a change in the bandwidth, $\Delta\lambda$, as the temperature of the LED's 105 change.

Figure 2:
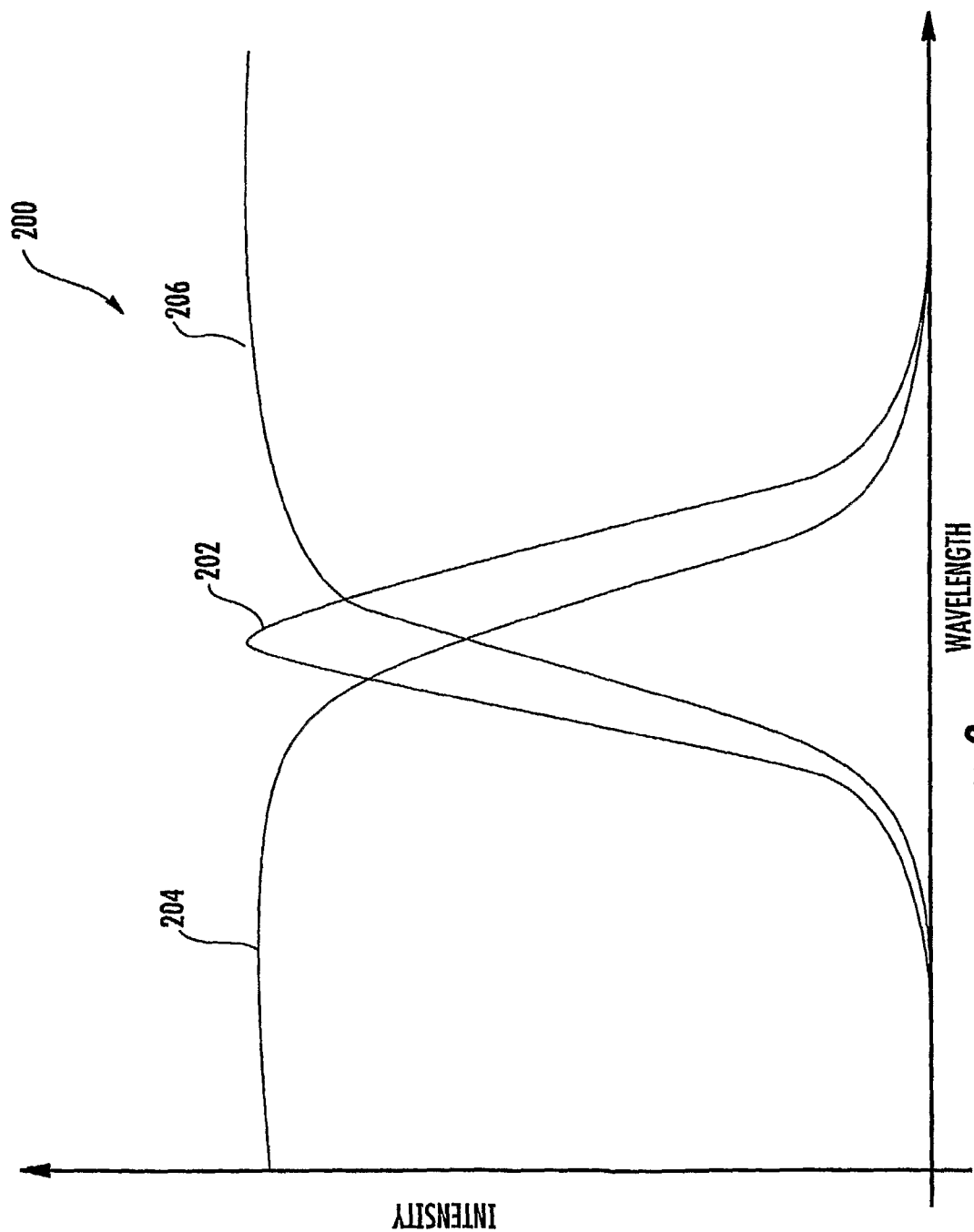
FIG. 2 shows a chart of the response curves of an LED and a pair of sensors according to various embodiments.
Figure 2A:
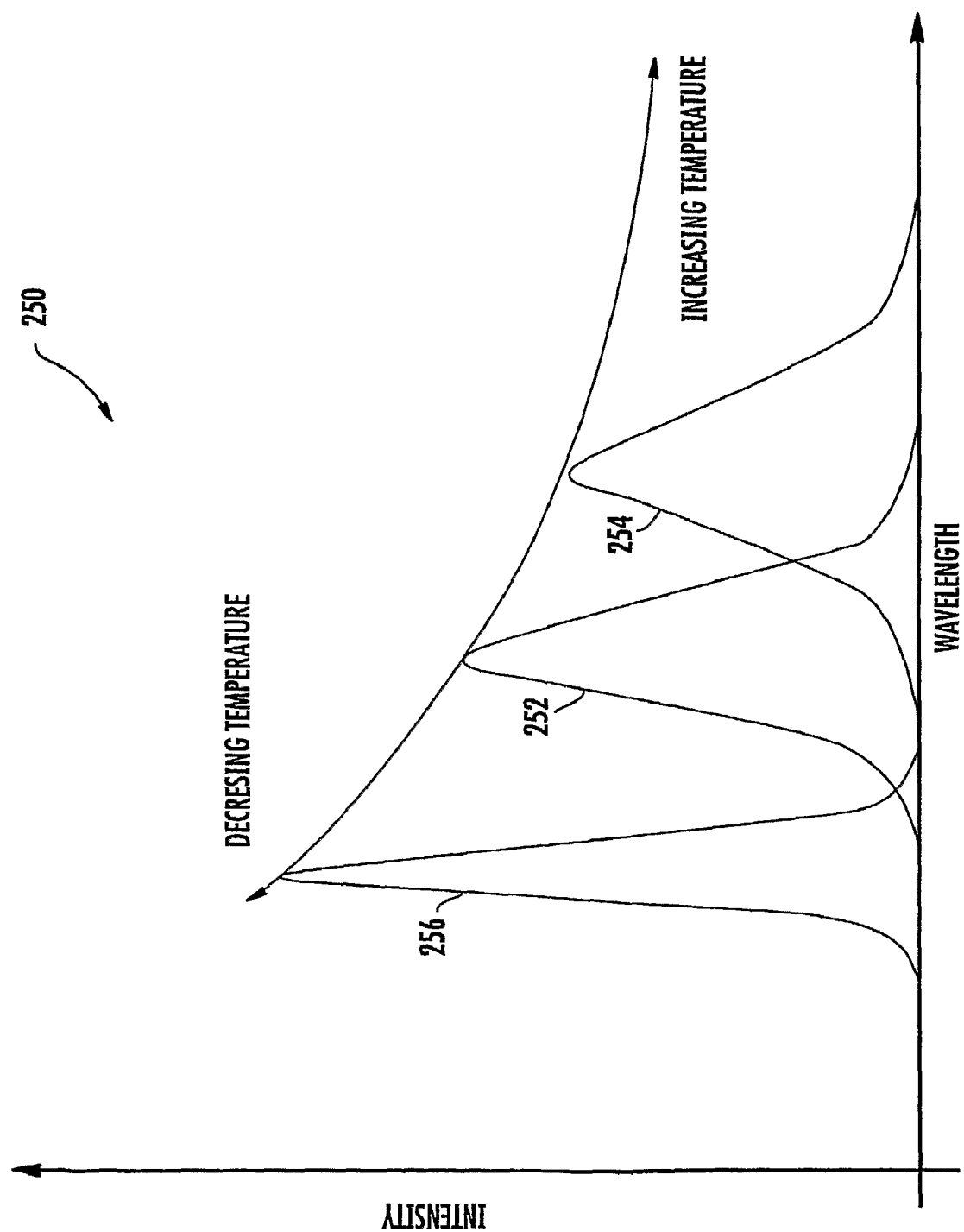
FIG. 2A shows a chart of various response curves of an LED at different temperatures.

For example, FIG. 2A shows a general shape of a model 250 of the spectral output of an LED, according to various embodiments. Three curves 252, 254 and 256 are shown representing the output of the LED at three different temperatures. The curve 252 shows the spectral output of the LED at a first temperature. The curve 254 shows the spectral output of the LED at a second temperature higher than the first. Finally, the curve 256 shows the LED at a third temperature lower than the first temperature. It can be seen that, generally, as temperature increases, the LED's spectral output may generally increase in bandwidth and decrease in intensity.

FIG. 2 shows a diagram 200 of the spectral responses of the LED 102 and filters 104, 106 in conjunction with the corresponding sensor or sensors 108, 110. Curve 202 represents the spectral output of the LED 102, while curves 204 and 206 represent the spectral responses of the filters 104 and 106, respectively. The filters 104, 106, as shown by filter curves 204 and 206, may be chosen to have adjacent or roughly overlapping attenuation bands at about the peak wavelength of the LED 102, shown by LED curve 202. In various embodiments, the LED 102 may be chosen with a nominal peak wavelength of 590 nm, while the filter 104 (curve 204) may be a green band-pass filter and the filter 106 (curve 206) may be a red band-pass filter. It will be appreciated, however, that the system 100 may include any suitable LED and filter combination. For example, a 505 nm LED and/or a 525 nm LED could be used in conjunction with blue and green filters.

As described above, it will be appreciated that as the temperature of the LED 102 changes, the position and/or shape of the curve 202 will also change in a predictable way. For example, as the temperature of the LED 102 increases, the LED spectral output 202 may be shifted to a longer wavelength (to the right in the diagram 200). When this occurs, more of the LED's total output may be attenuated by filter 104 (curve 204), and more of the LED's total output may be passed by the filter 106 (curve 206). As the temperature of the LED 102 decreases, the opposite may occur. Accordingly, the peak wavelength of the LED 102, and therefore its temperature, may be sensed by comparing the intensity of the LED 102 as viewed through filter 104 to the intensity of the LED 102 as viewed through filter 106.

Figure 3:
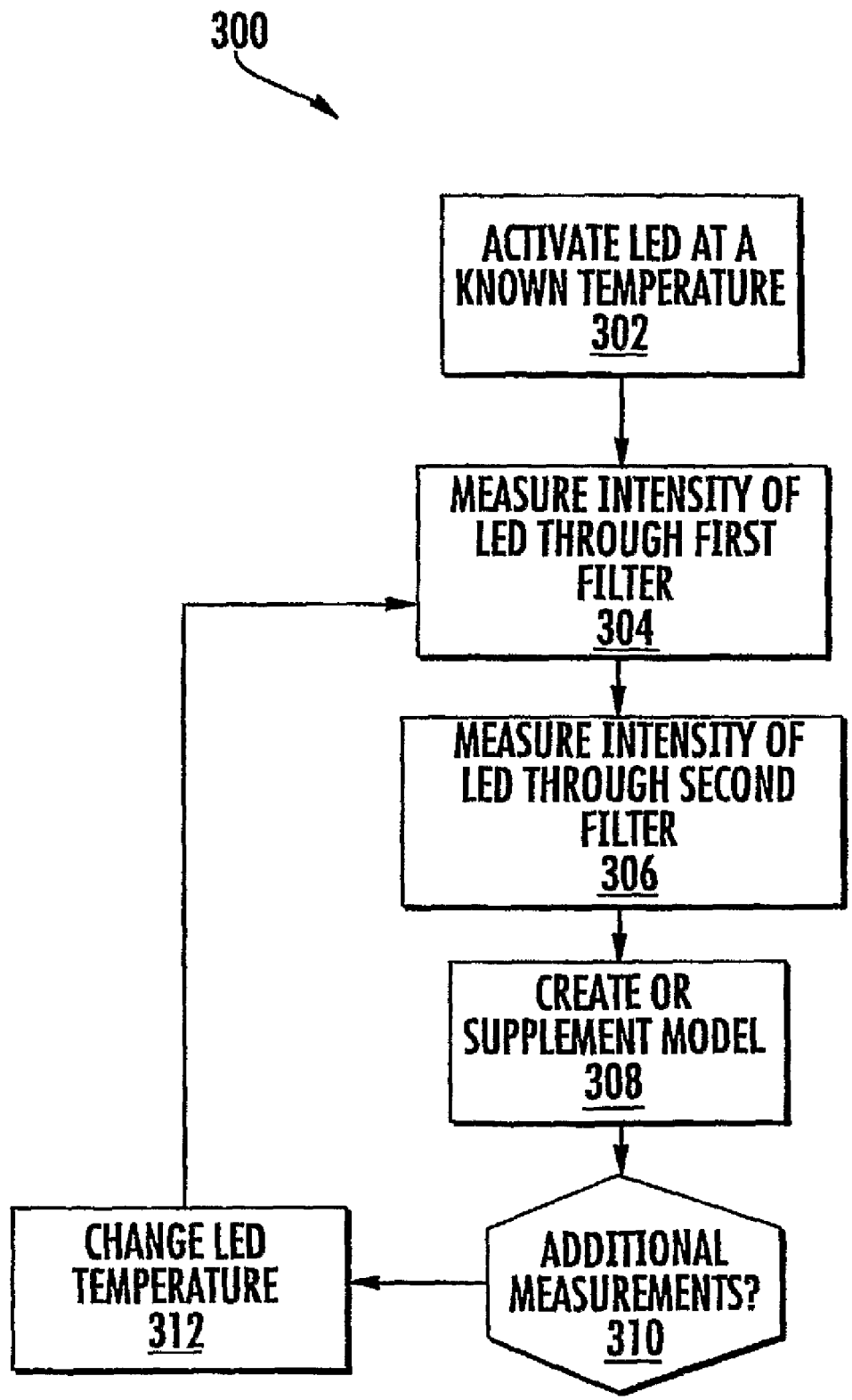
FIG. 3 shows a flowchart of a process flow for calibrating a system for measuring the temperature of an LED according to various embodiments.

FIG. 3 shows a process flow 300, according to various embodiments, illustrating a method for calibrating the temperature measuring system 100. It will be appreciated that the steps of the process flow 300 may be performed in any suitable order, and that some or all of the steps may be performed simultaneously. At step 302, the LED 102 may be activated at a first known temperature. The intensity of the LED 102 through the filter 104 may be measured at step 304. The intensity of the LED 102 through the filter 106 may be measured at step 306. At step 308, the computer 112 may create or supplement a model relating the temperature of the LED 102, the intensity of the LED 102 through the filter 104 and the intensity of the LED 102 through the filter 106 (e.g., the model shown above at FIG. 2A). In various embodiments, creating or supplementing the model may involve calculating one or more coefficients matching the observed intensities to the model. In various embodiments, the computer 112 may also explicitly solve for the peak wavelength of the LED 102.

At decision step 310, the computer may determine whether additional measurements will be taken to further supplement the model. If an additional measurement is desired, the temperature of the LED 102 may be changed at step 312. For example, the temperature of the LED 102 may be varied by allowing it to be activated for a given period of time, activating additional LED's near the LED 102, etc. The process may then continue with step 304 as described above. It will be appreciated that one measurement may be sufficient to develop the model, however, additional measurements may improve the accuracy of the model. Also, taking measurements over a broad range of temperatures or other operating conditions may allow the model to compensate for nonlinearities in LED heating behavior, the effects of additional LED's (not shown) near the LED 102, etc.

Figure 4:
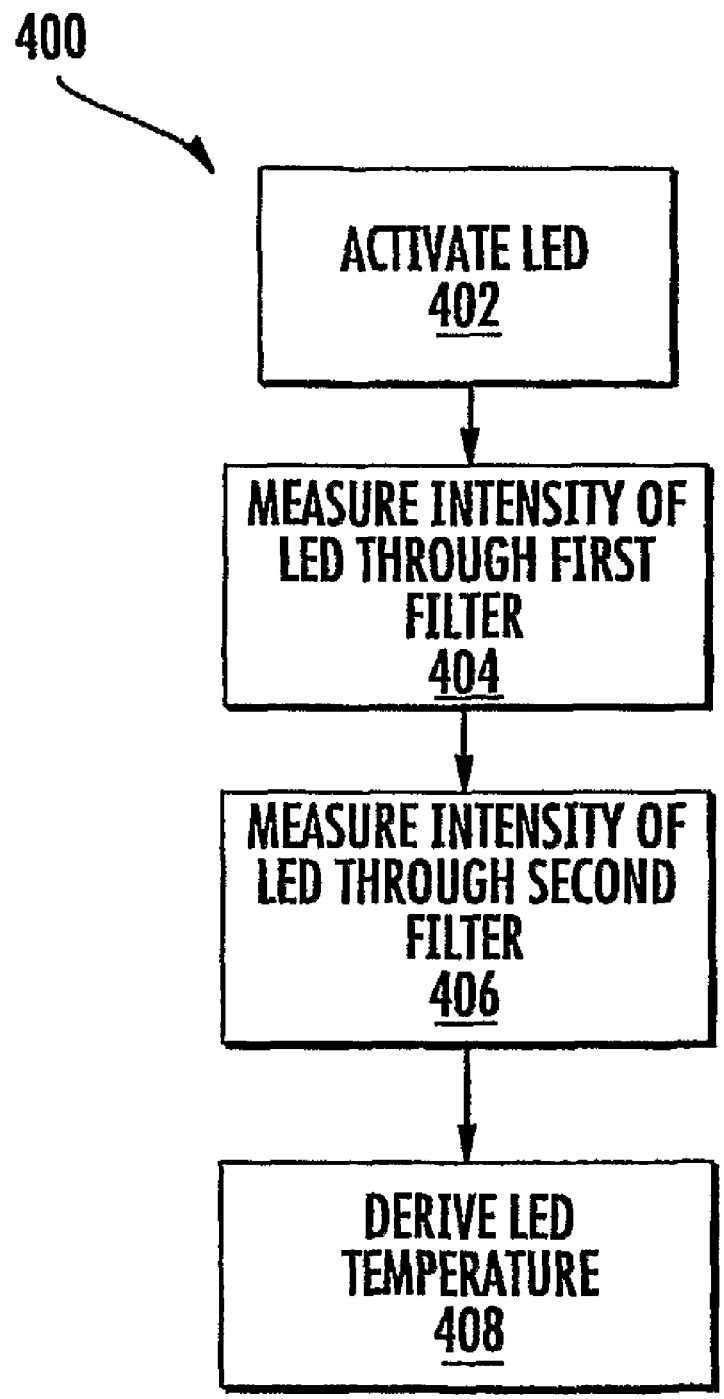
FIG. 4 shows a flowchart of a process flow for measuring the temperature of an LED according to various embodiments.

FIG. 4 shows a process flow 400, according to various embodiments, for measuring the temperature of the LED 102 using the system 100. At step 402, the LED 102 may be activated. The intensity of the LED 102 through the filter 104 may be measured at step 404, and the intensity of the LED 102 through filter 106 may be measured at step 406. It will be appreciated that the respective intensities of the LED 102 through filters 104 and 106 may be measured near the time that the LED 102 is activated, or at any time thereafter. At step 408, the first and second intensities of the LED 102 may be used to calculate a temperature of the LED 102, for example, according to a model generated as described above. The temperature of the LED 102 may then be used in any suitable way, for example, as described above. In various embodiments, the LED 102 may be part of an array of LED's positioned in close proximity to one another. It will be appreciated that, in this case, other LED's included in the array may be assumed to have the same temperature as the LED 102. This assumption is likely to be more accurate where all of the LED's in the array are activated for similar amounts of time under similar conditions.

It is to be understood that the figures and descriptions of the present invention have been simplified to illustrate elements that are relevant for a clear understanding of the present invention, while eliminating, for purposes of clarity, other elements, such as, for example, details of various physical models of LED's, etc. Those of ordinary skill in the art will recognize that these and other elements may be desirable. However, because such elements are well known in the art and because they do not facilitate a better understanding of the present invention, a discussion of such elements is not provided herein.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The computer 112 may operate according to software code to be executed by a processor(s) of the computer 112 or any other computer system using any type of suitable computer instruction type. The software code may be stored as a series of instructions or commands on a computer readable medium.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more data signals transmitted on one or more carrier waves.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

We claim:

1. A system for sensing a temperature of a light emitting diode (LED), the system comprising:
    the LED having a spectral output centered at a first wavelength;
    a first filter that transitions from attenuation to transmission at substantially the first wavelength;
    a second filter that transitions from transmission to attenuation at substantially the first wavelength;
    at least one sensor positioned to sense a first intensity of the LED through the first filter and a second intensity of the LED through the second filter; and
    a computer configured to derive a temperature of the LED considering the first intensity and the second intensity.

2. The system of claim 1, wherein the at least one sensor comprises a first sensor and a second sensor, and wherein the first filter is positioned between the LED and the first sensor and the second filter is positioned between the LED and the second sensor.

3. The system of claim 1, wherein the at least one sensor comprises a first sensor configured to selectively view the LED through the first filter and the second filter.

4. The system of claim 1, wherein the first wavelength is approximately 590 nm.

5. The system of claim 1, wherein the first filter is a green band-pass filter and the second filter is a red band-pass filter.

6. A method of determining a temperature of a light emitting diode (LED), the method comprising:
    sensing a first intensity of the LED through a first filter, wherein the first filter transitions from attenuation to transmission at substantially a peak wavelength of the LED;
    sensing a second intensity of the LED through a second filter, wherein the second filter transitions from transmission to attenuation at substantially the peak wavelength of the LED; and
    calculating a temperature of the LED considering the first intensity and the second intensity.

7. The method of claim 6, further comprising calculating a peak wavelength of the LED based on the first intensity and the second intensity.

8. The method of claim 6, further comprising calculating a spectral output of the LED considering the calculated temperature.

9. The method of claim 6, further comprising calculating a spectral output of a second LED positioned adjacent the first LED considering the calculated temperature.

10. The method of claim 6, further comprising activating the LED.

11. A method of calibrating a system for determining a temperature of a light emitting diode (LED), the method comprising:
    activating the LED at a first known temperature;
    sensing a first intensity of the LED through a first filter, wherein the first filter transitions from attenuation to transmission at substantially a peak wavelength of the LED;
    sensing a second intensity of the LED through a second filter, wherein the second filter transitions from transmission to attenuation at substantially the peak wavelength of the LED; and
    relating the first intensity and the second intensity to the first temperature.

12. The method of claim 11, further comprising: changing the temperature of the LED to a second known temperature; sensing a third intensity of the LED through the first filter; sensing a fourth intensity of the LED through the second filter; and relating the third intensity and the fourth intensity to the second temperature.

13. The method of claim 11, further comprising: activating at least one LED positioned near the LED; sensing a third intensity of the LED through the first filter; sensing a fourth intensity of the LED through the second filter; and relating the third intensity and the fourth intensity to the second temperature.

* * * * *